No. 851,252. PATENTED APR. 23, 1907.
G. R. PROWSE.
COOKING APPARATUS.
APPLICATION FILED NOV. 17, 1905.

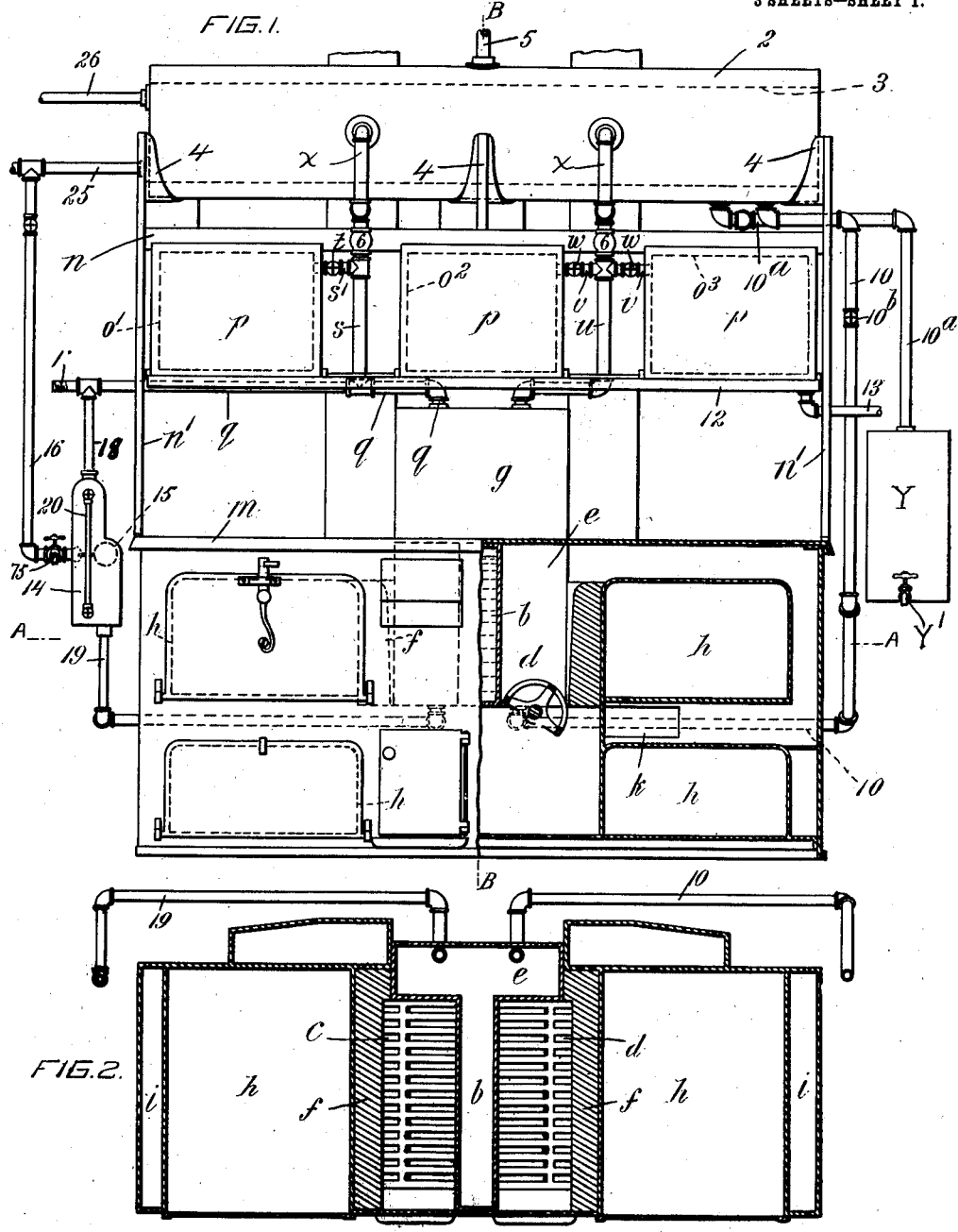

3 SHEETS—SHEET 2.

Witnesses
Alex Currie

George Roger Prowse
Inventor
By Attorney

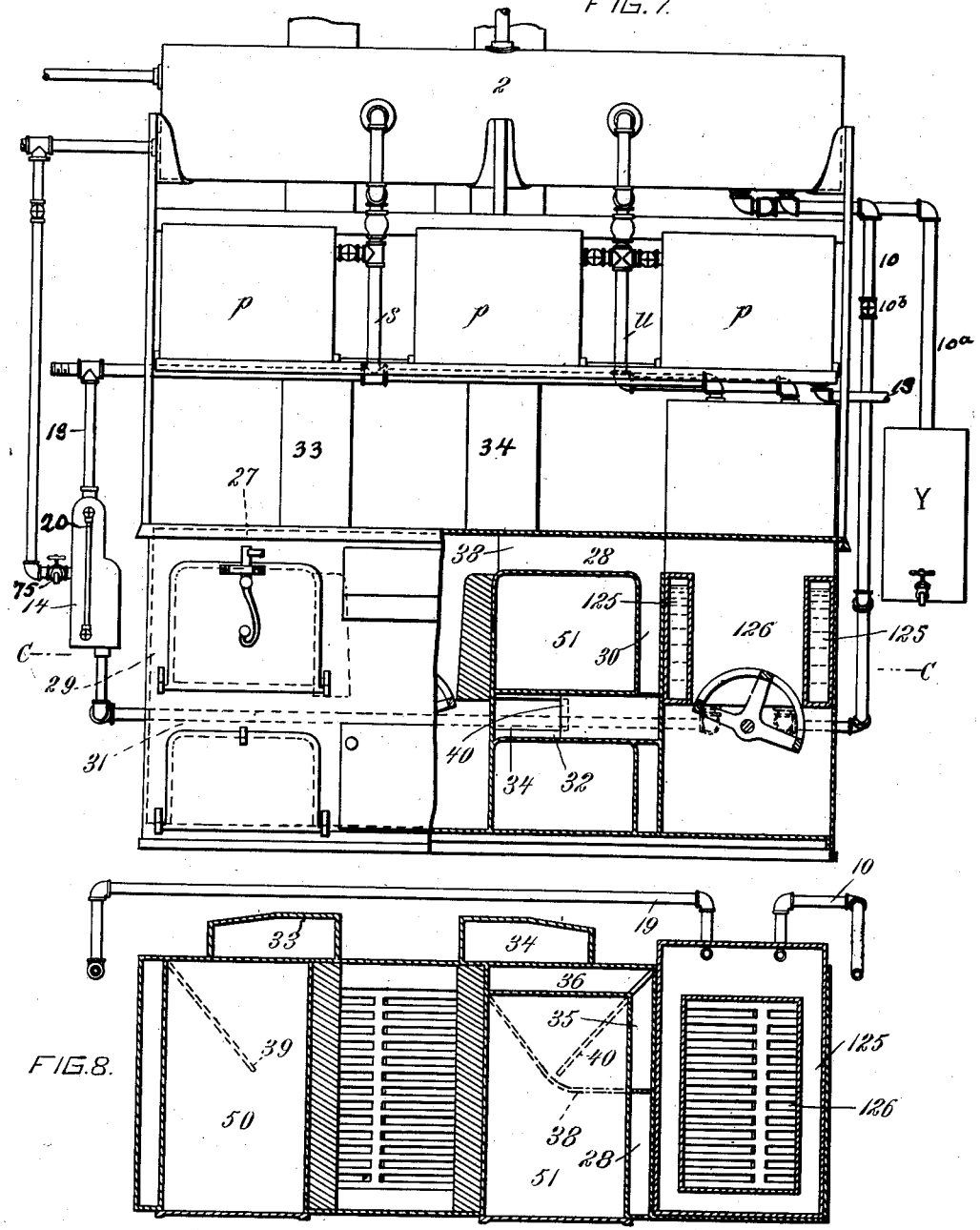

UNITED STATES PATENT OFFICE.

GEORGE ROGER PROWSE, OF MONTREAL, QUEBEC, CANADA.

COOKING APPARATUS.

No. 851,252.          Specification of Letters Patent.          Patented April 23, 1907.

Application filed November 17, 1905. Serial No. 287,878.

*To all whom it may concern:*

Be it known that I, GEORGE ROGER PROWSE, of the city of Montreal, Province of Quebec, Canada, have invented certain new and useful Improvements in Cooking Apparatus; and I do hereby declare that the following is a full, clear, and exact description of the same.

My invention has for its object to provide an apparatus adapted to cook by both the action of steam and direct radiant heat saturated steam being preferably utilized.

The invention may be said briefly to consist of a cooking apparatus comprising a steam generator forming one or more walls of the fire chamber the other wall or walls whereof are preferably constructed of refractory material, such generator communicating with a chamber, preferably forming an integral part thereof, in which the steam is collected and from which it is either conducted to a water heating device and back to the generator in a closed circuit or distributed through a suitable system of piping to one or more steam cooking chambers, and a condenser in which a separate body of water is heated for domestic purposes and the steam is condensed and collected in the form of distilled water. The steam generator, and condenser, together with the system of piping uniting the same, from the closed circuit above mentioned in which a comparatively small body of water is alternately vaporized and condensed, thereby using the same over and over again. The arrangement of the said parts with relation to one another and to one or more baking ovens and the fire chamber or chambers is such that a suitable distribution of the heat from the fire chamber or chambers will be effected through all of the said members, and furthermore that the entire top of the apparatus (for frying, broiling, or like purposes) will be exposed.

Figure 3:
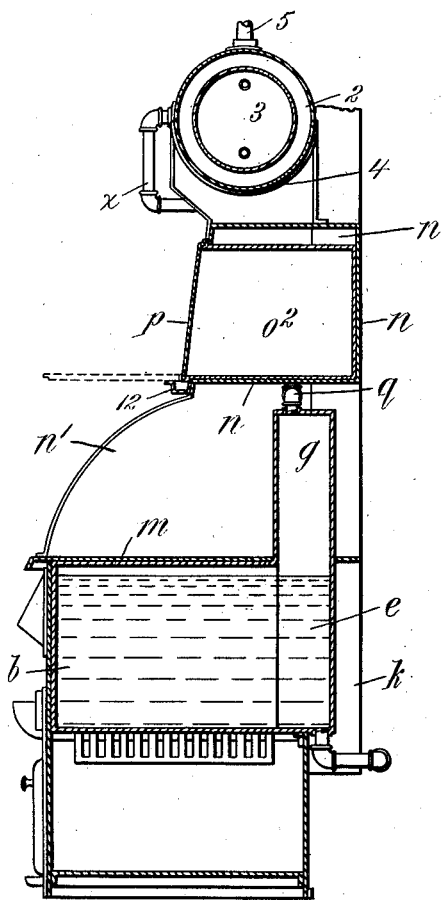
Figure 4:
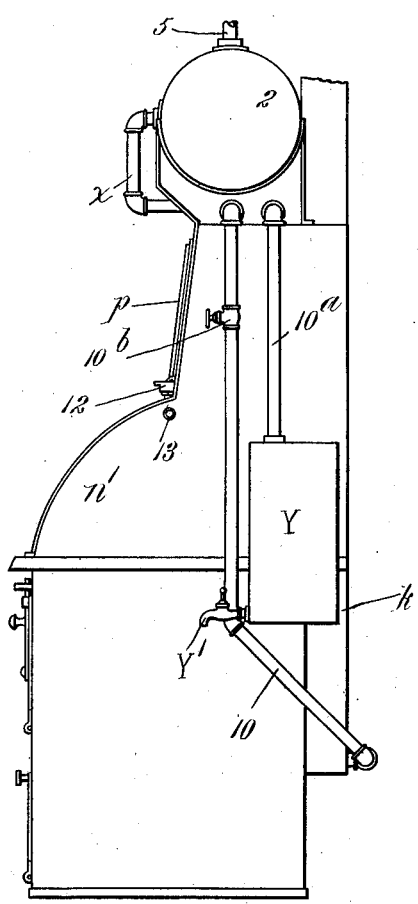
Figure 5:
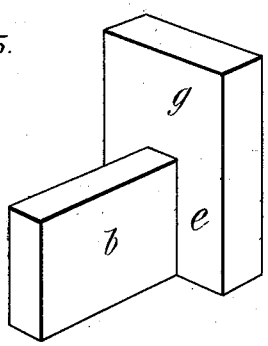
Figure 6:
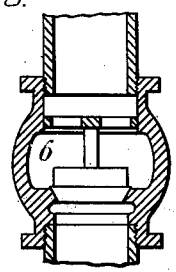

For full comprehension, however, of my invention reference must be had to the accompanying drawings forming a part of this specification in which similar reference characters indicate the same parts and wherein Figure 1 is a front elevation partly in section; Fig. 2 is a horizontal sectional view taken on line A, A, Fig. 1; Fig. 3 is a transverse vertical sectional view taken on line B, B, Fig. 1; Fig. 4 is an end elevation; Fig. 5 is a detail perspective view of the steam generator; and Fig. 6 is a detail sectional view of the valve for checking the passage of the steam from the steam cooking chambers and retaining the same therein until steam is accumulated to the full capacity of such chambers. Fig. 7 is a similar view to Fig. 1 of a modification of my invention; and Fig. 8 is a horizontal sectional view taken on line C C Fig. 7.

The middle portion of my improved apparatus is preferably divided by a water section $b$ into two independent fire chambers $c$ and $d$ the adjacent sides whereof are formed by such water section, and the back or rear wall of each fire chamber is formed by a transverse water section $e$ in communication with and, preferably, an integral part of the middle water section $b$ and constituting therewith a boiler or steam generator of T-form in horizontal cross-section; while the two opposite sides of the combustion chambers are preferably of usual construction and lined with fire brick as at $f$.

The top of the transverse section $e$ extends above the middle section $b$, as at $g$, and serves as a steam dome.

The remainder of the body of the cooking apparatus is of usual construction and is provided with ovens $h$ and draught flues $i$ leading from the combustion chambers to a chimney connection $k$. These parts form no part of my invention and may be of any preferred construction.

Above the top $m$ of the range and at a sufficient height to not interfere with cooking operations upon such top, I support, preferably in a box-like frame $n$ supported in turn upon sides $n'$, a series of, preferably, three steam cooking chambers ($o'$, $o^2$ and $o^3$) having doors $p$. A steam supply pipe, $q$ leads from the top of the dome, $g$, along beneath the chambers $o'$ and $o^2$ and the end $r$ thereof is adapted to have coupled thereto a pipe or other connection (not shown) leading to any desired point of distribution or use, for heating a carving-table or for other domestic purposes.

A branch $s$ leads from this supply pipe and has a branch $s'$ leading to the chamber $o'$ and controlled by a valve $t$, and a second supply pipe $u$ also leading from the dome $g$ has a pair of branches $v$ controlled by valves $w$ and leading to the chambers $o^2$ and $o^3$, while branches $x, x$, lead from the upper ends of the branch $s$ and supply pipe $u$ to a steam jacket 2 enclosing a water tank 3.

A pair of check valves 6 of well known construction are located at the point of juncture of the branch s and supply pipe u with the branches x, x, and they are adapted to prevent the steam flowing past the chambers o' o² and o³ until such chambers contain their full capacity and ensuring the supply to other apparatus through the connection at r. The slightest pressure in these steam cooking chambers will raise these check valves and allow the steam to escape to the jacket 2. The jacketed tank is supported above the series of steam cooking chambers in brackets 4 secured upon the top of the box-like frame n, and a safety blow-off pipe 5 leads from the top thereof to any available waste pipe or to the outside atmosphere.

A pipe 10 is provided to conduct the condensed steam from the jacket 2 back to the boiler b, and a gutter 12 extends along the front of the steam cooking chambers which communicate therewith for the same purpose, while a drip pipe 13 conducts the water of condensation from this gutter to waste. A second pipe 10ª leads also from the lower portion of the jacket to a receptacle of any suitable form and preferably a tank Y having a faucet Y'. The tank Y is adapted to collect the water of condensation or distilled water flowing from the steam jackets, the pipe 10 being provided with a valve 10ᵇ to deflect the said distilled water when desired.

I prefer to provide means for automatically maintaining the water in the steam generator b at a proper level. To this end I utilize a closed chamber 14 which contains a ball cock 15 which controls the flow of water from a pipe 16 which in turn leads from the water tank 3 or other available source of water, a branch pipe 18 leads from the steam pipe q to the top of this chamber 14 and a second branch 19 leads from the bottom thereof to the bottom of the steam generator, while a glass gauge 20 upon the front of and communicating with the chamber 14 indicates the level of water in the latter and consequently in the steam generator.

When fires are started in the combustion chambers the heat will boil the water in b and e and the steam generated will accumulate in the dome g, the fire brick sides f as ordinarily reflect the heat back into the fire.

The draught flues will draw the heated gases of combustion around the ovens or over the same to the chimney connection, according to requirements, in the usual way, and the ovens are used also in the usual way.

The entire cooking top of the apparatus is available for broiling, frying or the like and any cooking usually done there, and different vegetables or other food can be steam-cooked in the chambers o' o² and o³, while the superfluous steam is used up in heating the water in the tank 3 or in supplying heat for a carving table or for other domestic purposes. The water of condensation is deflected, according to requirements to the receptacle Y where it is collected as distilled and therefore purified water.

An important advantage in connection with my improved cooking apparatus is that only a small quantity of water is required, as it is contained in a closed circuit, and serves mainly as a heat conducting medium and is usually used over and over again, it being vaporized and condensed alternately and repeatedly. This small body of water may be first freed of alkali or other matter likely to be deposited upon or attached to the interior of the generator. It then serves as a medium through which heat is transmitted to alkali or other impure water contained in the tank without damaging the interior of the generator.

Flow and return pipes 25 and 26 connect the water heating tank 3 to the hot water system of the dwelling, and the valve controlled pipe 16, before mentioned connects the pipe 25 to the ball cock controlling device in order to enable hot water to be supplied to the generator at will.

A tap 75 is provided for drawing off hot water for domestic use.

If desired a single combustion chamber may be located between the ovens, and a second combustion chamber be utilized to supply heat to the steam generator. In Figs. 7 and 8 a cooking apparatus thus constructed is illustrated and the steam generator 125 thereof completely encloses one of the combustion chambers 126. The currents of the heated gases of combustion, in this embodiment are from the central combustion chamber horizontally through flues 27 and 28 over both ovens 50 and 51 down, flues 29 and 30 and horizontally through flues 31 and 32 beneath the ovens to the chimney connections 33 and 34; and from the combustion chamber 126 horizontally along a flue 35 and down a rear flue 36 behind the oven 51 to the chimney connection 34.

A diaphragm 38 divides the space over the oven 51 into the two flues 28 and 35 and a pair of diaphragms 39 and 40 within the flues 31 and 32 beneath the ovens, act as bafflers and distribute the heated gases over the entire bottoms of the said ovens.

What I claim is as follows:—

1. In a cooking apparatus the combination with a steam generator of angular horizontal section and constituting two walls of the combustion chamber, of a pair of receptacles, a main pipe leading from the steam generator to the interior of one of the receptacles, a branch pipe leading from the main pipe to the other receptacle, and a means maintaining a limited pressure in the first receptacle and allowing an excessive pressure in the said first receptacle to flow to the second receptacle, the portions of the said generator contiguous to the different walls being in direct communication with one another, and means whereby the steam is distributed for domestic purposes.

2. In a cooking apparatus the combination with a steam generator of angular horizontal section and constituting two walls of the combustion chamber, and a receptacle formed by an upward extension of the generator for accumulating the steam generated, of a pair of receptacles, a main pipe leading from the steam generator to the interior of one of the receptacles, a branch pipe leading from the main pipe to the other receptacle, and a means maintaining a limited pressure in the first receptacle and allowing an excessive pressure in the said first receptacle to flow to the second receptacle.

3. In a cooking apparatus having a pair of combustion chambers, the combination with a steam generator presenting a portion forming the back of both combustion chambers and a leg communicating directly with and extending forwardly from the said back and dividing the said combustion chambers from one another, and a receptacle formed by an upward extension of the back portion of the generator and constituting a dome for accumulating the steam generated, of a pair of receptacles, a main pipe leading from the steam dome to the interior of one of the receptacles and, a branch pipe leading from the main pipe to the other receptacle, and a means maintaining a limited pressure in the first receptacle and allowing an excessive pressure to flow to its second receptacle.

4. In a cooking apparatus the combination with a steam generator, of a pair of receptacles, a main pipe leading from the steam generator to the interior of one of the receptacles, a branch pipe leading from the main pipe to the other receptacle, and a means maintaining a limited pressure in the first receptacle and allowing an excessive pressure in the said first receptacle to flow to the second receptacle.

5. In a cooking apparatus the combination with a steam generator, of a pair of receptacles, a main pipe leading from the steam generator to the interior of one of the receptacles and, a branch pipe leading from the main pipe to the other receptacle, and a check valve controlling the said branch.

6. In a cooking apparatus the combination with a steam generator, of a steam cooking chamber, a liquid containing device, a pipe leading from the steam generator to the interior of the steam cooking chamber, a branch pipe leading from the first mentioned pipe to the liquid containing device, and a check valve controlling the said branch and located at a point between the junction of the branch with the main pipe and the liquid containing device.

7. In a cooking apparatus the combination with a steam generator, of a pair of receptacles, a main pipe leading from the steam generator to the interior of one of the receptacles and, a branch pipe leading from the main pipe to the other receptacle, a check valve controlling the said branch, and an automatically controlled water supply to the generator.

8. A cooking apparatus comprising a pair of combustion chambers, a steam generator of T horizontal section and constituting the rear walls and the walls adjacent to one another of the combustion chambers, the opposite walls of such chambers being formed of fire brick, and the fronts being closed by doors, a steam dome formed by a vertical extension of the rear portion of the generator, a horizontal series of steam cooking chambers supported above the top of the cooking apparatus, steam supply pipes leading from the dome to the interior of such series of chambers, means for conducting the water of condensation from the said series of chambers, a water tank, a steam jacket enclosing such tank, branch pipes leading from the supply pipes to the jacket, check valves controlling such branch pipes, and pipes for conducting the water of condensation from the jacket back to the steam generator.

9. A range comprising a pair of combustion chambers, a steam generator of T horizontal section and constituting the rear walls and the walls adjacent to one another of the combustion chambers, the opposite walls of such chambers being formed of fire brick, and the fronts being closed by doors, a steam dome formed by a vertical extension of the rear portion of generator, a horizontal series of steam cooking chambers supported above the top of the range, steam supply pipes leading from the dome to the interior of such series of chambers, means for conducting the water of condensation from the said series of chambers, a water tank, a steam jacket enclosing such tank, branch pipes leading from the supply pipes to the jacket check valves controlling such branch pipes and pipes for conducting the water of condensation from the jacket back to the steam generator, a closed chamber, a pipe leading from a source of water to such closed chamber, a ball-cock within the closed chamber and controlling the last mentioned pipe, and a pair of pipes connecting the upper and lower portions respectively of the steam generator to the top and bottom, respectively of the closed chamber.

10. A cooking apparatus comprising a pair of combustion chambers, a steam generator of T horizontal section and constituting the rear walls and the walls adjacent to one another of the combustion chambers, the opposite walls of such chambers being formed of fire brick, and the fronts being closed by doors, a steam dome formed by a vertical extension of the rear portion of generator, a horizontal series of steam cooking chambers supported above the top of the range, steam supply pipes leading from the dome to the interior of such series of chambers, means for conducting the water of condensation from the said series of chambers, a water tank, a steam jacket enclosing such tank, branch pipes leading from the supply pipes to the jacket, check valves controlling such branch pipes, pipes for conducting the water of condensation from the jacket back to the steam generator, a closed chamber, a pipe leading from the said water tank to the closed chamber, a ball-cock within the closed chamber and controlling the last mentioned pipe, a pair of pipes connecting the upper and lower portions respectively of the steam generator to the top and bottom, respectively, of the closed chamber.

11. In a cooking apparatus a steam generator, a receptacle in communication with such steam generator in which the steam is collected, a receptacle adapted to contain water to be heated, a hollow jacket within which the last mentioned receptacle is located, a steam conductor leading from the receptacle in which the steam is collected to the interior of the said jacket, a check valve controlling the last mentioned conductor, a valve controlled return conductor leading from the jacket to the generator, a tank having a faucet, and a pipe leading from the said jacket to the tank.

In testimony whereof, I have signed my name to this specification, in the presence of two subscribing witnesses.

GEORGE ROGER PROWSE.

Witnesses:
WILLIAM P. McFEAT,
FRED. J. SEARS.